No. 842,210. PATENTED JAN. 29, 1907.
C. R. KNAPP & V. MULHOLLAND.
DEVICE FOR CONVEYING GLASSWARE TO LEERS.
APPLICATION FILED JUNE 14, 1906.

3 SHEETS—SHEET 1.

WITNESSES. INVENTORS

No. 842,210. PATENTED JAN. 29, 1907.
C. R. KNAPP & V. MULHOLLAND.
DEVICE FOR CONVEYING GLASSWARE TO LEERS.
APPLICATION FILED JUNE 14, 1906.

3 SHEETS—SHEET 2.

WITNESSES.
J. R. Keller
Robert C. Totten

INVENTORS
Charles R Knapp
Vergil Mulholland
By Kay Totten & Winter
attorneys

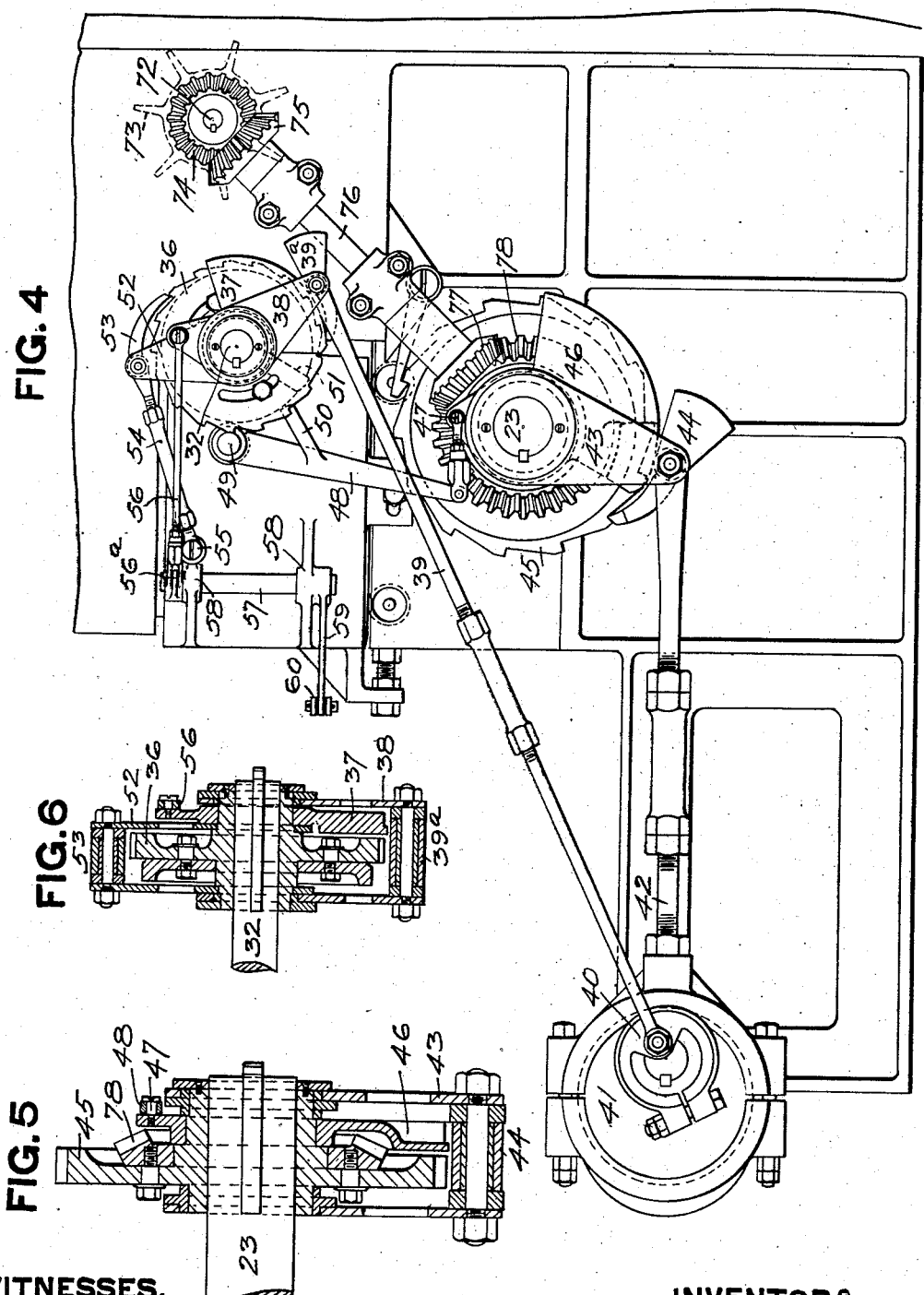

UNITED STATES PATENT OFFICE.

CHARLES R. KNAPP, OF PITTSBURG, AND VERGIL MULHOLLAND, OF ALLEGHENY, PENNSYLVANIA, ASSIGNORS TO HEYL & PATTERSON INCORPORATED, OF PITTSBURG, PENNSYLVANIA, A CORPORATION OF PENNSYLVANIA.

DEVICE FOR CONVEYING GLASSWARE TO LEERS.

No. 842,210.     Specification of Letters Patent.     Patented Jan. 29, 1907.

Application filed June 14, 1906. Serial No. 321,734.

*To all whom it may concern:*

Be it known that we, CHARLES R. KNAPP, a resident of Pittsburg, in the county of Allegheny and State of Pennsylvania, and VERGIL MULHOLLAND, a resident of Allegheny, county and State aforesaid, have invented a new and useful Improvement in Devices for Conveying Glassware to Leers; and we do hereby declare the following to be a full, clear, and exact description thereof.

Our invention relates to apparatus for introducing glassware to leers, its object being to provide a device of this character in which the bottles, jars, or other glass articles are brought up and carried into the leer in regular succession, so as to form a line of ware extending the length of the leer-pans and at the same time provide for the handling of the ware in such a manner as to avoid liability of breakage, and, further, to simplify the mechanism, so as to reduce the liability of the machine getting out of order.

To these ends our invention comprises the novel features hereinafter set forth and claimed.

Figure 1:
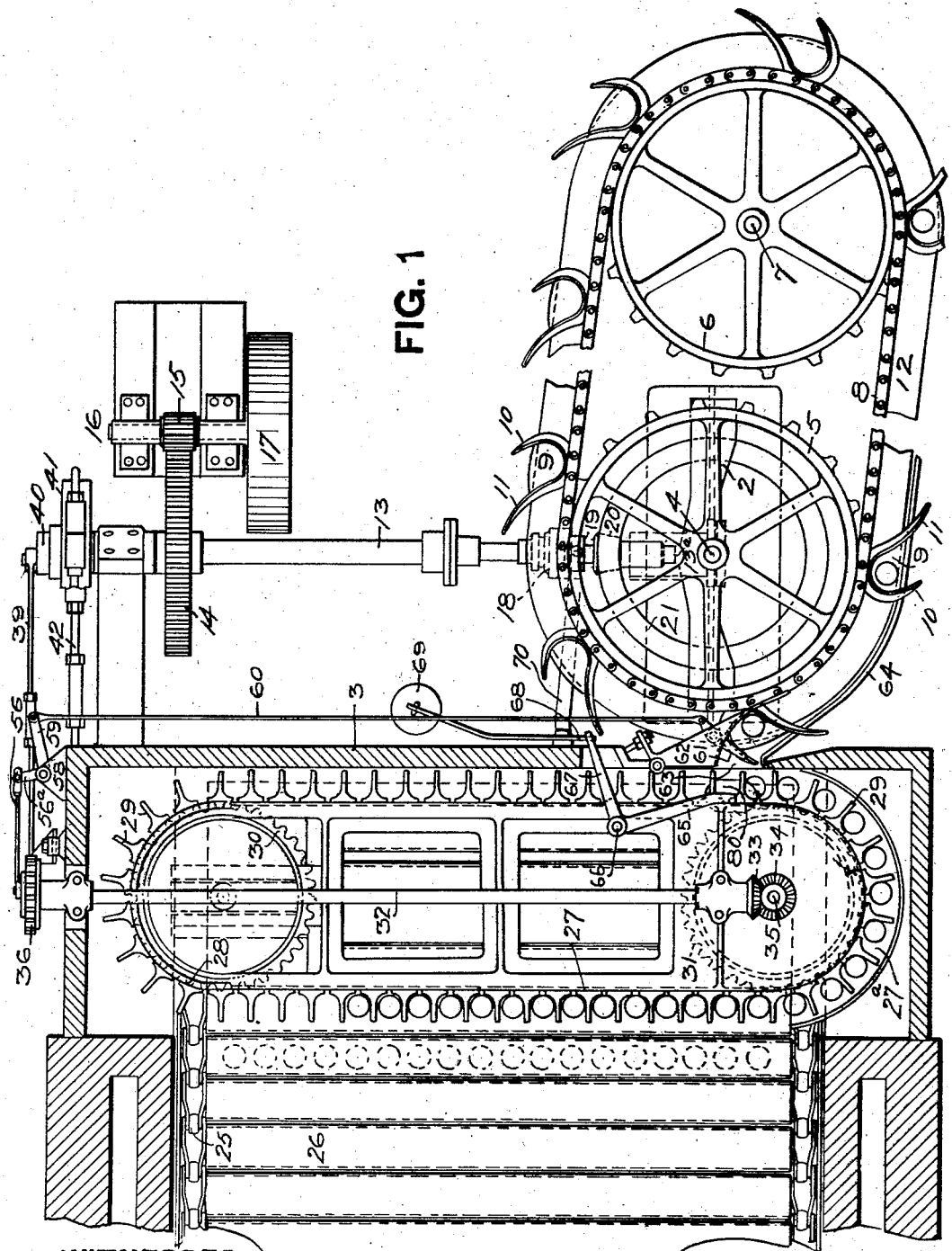
Figure 2:
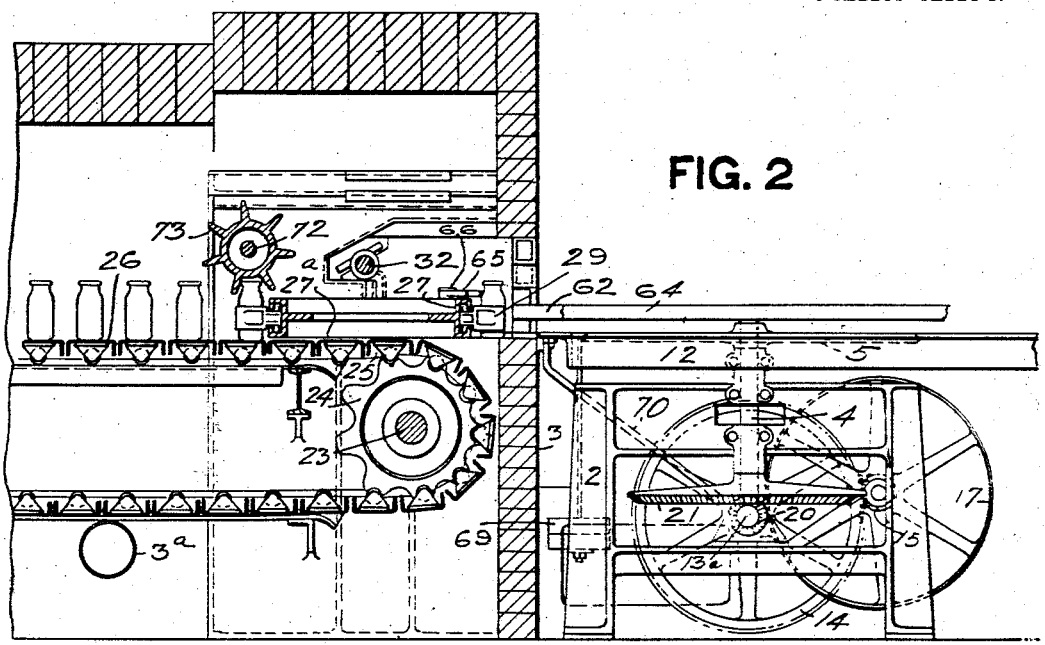
Figure 3:
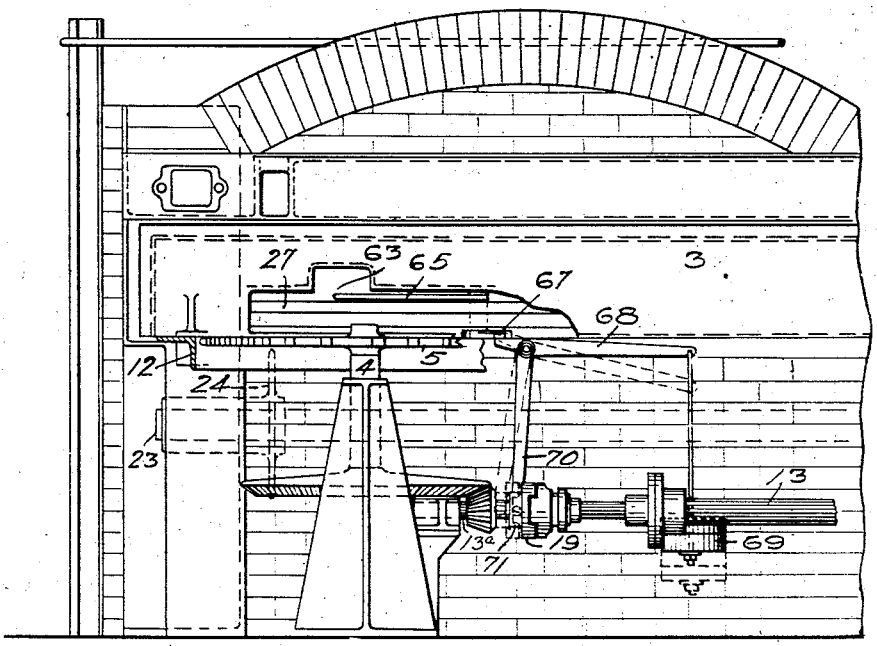

In the accompanying drawings, Figure 1 is a plan view, broken away and partly in section, of our improved apparatus. Fig. 2 is a side view showing the leer and the parts contained therein in section. Fig. 3 is a front view of the leer. Fig. 4 is an enlarged side view showing the mechanism by means of which the conveyer is operated and the leer-pans moved, and Figs. 5 and 6 are sectional details.

Like numerals indicate like parts.

In the drawings the numeral 2 designates a suitable framework arranged in front of the leer 3, said framework having the vertical shaft 4 journaled therein, which carries the sprocket-wheel 5. The leer may be heated in any suitable manner, the gas-pipes $3^a$ supplying heat to heat the forward end of said leer. At any suitable distance in the rear of the frame 2 is a suitable frame in which the sprocket-wheel 6 is supported upon shaft 7. A chain 8 engages the sprocket-wheels 5 and 6 and is driven thereby, said chain having at intervals thereon the trays 9, adapted to receive the ware transferred thereto directly from the shops, which may be arranged in close proximity to the conveyer. Projecting out from the pans 9 are the arms 10 and 11, said arms curving outwardly, as clearly shown in Fig. 1. The chain moves in a suitable guide-frame 12.

A power-shaft 13 is journaled in suitable bearings, said shaft having the gear-wheel 14 thereon, which meshes with the pinion 15 on the shaft 16, which is connected up to any suitable source of power. Shaft 16 has the fly-wheel 17. The shaft 13 has the clutch 18 thereon, with which the sliding clutch-sleeve 19 is adapted to engage, said sleeve being mounted to slide on a feather on said shaft. A pinion 20 is mounted on shaft $13^a$, said pinion being adapted to engage the large beveled gear 21 on the shaft 4, by means of which power is communicated to sprocket-wheel 5 to drive the chain 8.

Within the leer is journaled the shaft 23. Mounted on this shaft 23 are the sprocket-wheels 24, with which the chain 25 of the leer-conveyer engages. This chain 25 engages with like sprocket-wheels at the opposite end of the leer. (Not shown.) Secured to the chain 25 are the leer-pans 26, which support the ware during its passage through the leer.

Within the leer is the conveyer 27, said conveyer consisting of the chain 28, with the flights 29 secured thereto at suitable intervals, said flights traveling above the plate $27^a$, upon which the ware rests in being conveyed to the leer-pans. The chain 28 engages the sprocket-wheels 30 and 31, and said chain is driven thereby. The shaft 32 is journaled in suitable bearings within the leer, and at one end of said shaft is the beveled gear 33, which meshes with the beveled gear 34 on the shaft 35, carrying the sprocket-wheel 31. At the opposite end of the shaft 32 is the ratchet-wheel 36. On the shaft 32 is the swinging segment 37, the outer edge of said segment projecting beyond the teeth of the ratchet 36. An arm 38 on the shaft 32 is connected to the rod 39, said rod carrying the pawl $39^a$, which is adapted to engage the teeth of the ratchet 36 when the quadrant 37 is withdrawn, as will more fully hereinafter appear. The rod 39 is connected at its opposite end to the crank-disk 40 on the shaft 13, by which a reciprocating movement is imparted to the rod 39.

Mounted on the shaft 13 is the eccentric 41, and to the strap of said eccentric is connected the rod 42. The opposite end of the rod 42 is connected to the arm 43 on the shaft 23. A pawl 44 on the rod 42 is adapted to engage the ratchet-wheel 45 on the shaft 23. On the shaft 23 is the swinging quadrant 46, the edge of which extends beyond the teeth of the ratchet 45, so as to prevent the engagement of the pawl 44 with the teeth of said ratchet to move said ratchet except when the quadrant 46 is swung out of the way. Connected to the upper end of the quadrant 46 is the pin 47, which is connected to the lever 48, mounted on the stud 49. This lever 48 has the finger 50, which is adapted to be engaged by the cam-lug 51 on the ratchet-wheel 36.

On the shaft 32 is the arm 52, which carries the pawl 53, adapted to engage the teeth on the ratchet 36. A rod 54 is connected to the pawl 53, said rod being journaled on the stud 55. This pawl 53 prevents the backward movement of the ratchet 36.

Connected to the quadrant 37 is the rod 56, which is connected to the arm 56ᵃ on the rock-shaft 57, journaled in suitable bearings 58. Connected to the opposite end of the rock-shaft 57 is the arm 59. This arm 59 is connected to the rod 60, which extends crosswise of the leer and is connected at its opposite end to the trip-finger 61, mounted in the bracket 62. This trip-finger 61 is mounted at the entrance 63 of the leer and is directly in the path of the bottles or other articles carried by the pans 9. The bracket or guide 62 acts to remove the ware from the pans, and as the ware moves from the pans the arm 11 on the pans comes along and acts to guide the ware and move it into the space between the flights of the conveyer 27, all as fully hereinafter set forth. A guide 64 is employed leading up to one side of the opening 63 to insure the proper guidance of the ware to the opening 63.

Just above the conveyer 27 is the arm 65, with one end in line with the ware entering between the flights of said conveyer. This arm 65 is mounted on the stud 66, and projecting therefrom is the arm 67. This arm 67 engages the arm 68, to which is connected the weight 69. The lever 70 is connected to the arm 68, said lever engaging the annular groove 71 in the clutch-sleeve 19.

Mounted on the shaft 72 is the spider 73, which extends across the leer just over and in front of the conveyer 27 for the purpose fully hereinafter set forth. The shaft 72 has on its outer end the beveled gear 74, which meshes with the beveled gear 75 on the shaft 76. The shaft 76 has the gear 77, which meshes with the beveled gear 78 on the ratchet-wheel 45. In this manner power is communicated to the spider 73 to rotate the same.

When our improved apparatus is in use, the ware is placed upon the pans 9, and when power is applied from the shaft 13 through the clutch mechanism to drive the shaft 4 the chain 8 is driven around so as to bring the pans up in position for the ware to be fed through the opening 63 of the leer to the conveyer 27. As the bottle or other piece of ware strikes the trip-finger 61 said finger is moved so as to draw on the rod 60 and through the arm 59, rock-shaft 57, arm 56ᵃ, and rod 56 pull on the quadrant 37 so as to throw it around in such position that the pawl 39ᵃ on the rod 39 is able to engage the teeth of the ratchet 36. As the rod 39 is reciprocating continuously the pawl 39ᵃ will drop into one of the teeth of the ratchet, and as the rod reciprocates the ratchet will be moved the distance of one tooth. This imparts a rotary movement to the shaft 32, and through its connections with the sprocket-wheel 31 said sprocket-wheel is driven, and with it the conveyer 27. Meanwhile the bottle has been introduced into one of the spaces between the flights 28 of the conveyer 27, so that as the conveyer 27 advances the bottle is carried beyond the opening 63 and another space in the conveyer is brought around in position to receive the next bottle. Just as soon as the bottle passes beyond the trip-finger 61 said finger is carried to its normal position, and through the connections described the quadrant 37 is brought around to position to prevent the pawl 45 from engaging with the teeth of the ratchet 36 until another bottle comes around and engages the trip-finger 61, when the operation just described is repeated. Just as soon as the ware passes through the opening 63 and takes its position between the flights 28 of the conveyer 27 it is within the leer, and the annealing process begins even before it is actually deposited on the leer-pan.

The number of teeth on the ratchet 36 corresponds to the number of pieces of ware which it takes to form a line of ware extending from one end of one of the pans 26 to the opposite end. When, therefore, a line of ware has been completed on one of the pans 26 with the ware still engaged by the flights of the conveyer 27, it is of course necessary to move the pans forward, so as to bring up another empty pan in position to be filled. Accordingly when the ratchet-wheel 36 has made a complete revolution the cam-lug 51 comes around in position to engage the finger 50 on the lever 48. This moves the lever 48 so as to draw on the pin 49 and rock the swinging quadrant 46 so as to permit the pawl 44 to engage the teeth of the ratchet 45, and as the rod 42 is reciprocated by the eccentric 41 the ratchet-wheel 45 is moved the distance of one tooth. This imparts a like movement to the shaft 23, which is sufficient to rotate said shaft so as to cause the leer-conveyer 25 to move a sufficient distance to bring another empty pan up in position to receive another row of ware.

The spider 73 stands in such position with reference to the ware arranged by the conveyer 27 upon the leer-pan that the upper portion of the ware will be in front of one of the wings of said spider, so as to prevent the displacement of the ware for any reason. Furthermore, this spider is adapted to revolve at the same time that the leer-conveyer moves forward one pan, so that it moves simultaneously with the leer-pan. This rotation of the spider is accomplished through the rotation of the shaft 76, which receives its movement from the rotary movement imparted to the shaft 23 by the pawl 44 engaging the ratchet 45. Accordingly the spider is revolved at the same time that the rotary movement is imparted to the shaft 23.

If it should happen for any reason that the conveyer 27 should fail to move forward after a bottle had been introduced thereto and another bottle should be brought up by the conveyer 8 and forced into the same compartment occupied by a bottle, the introduction of the second bottle would force the first bottle against the outer end of the arm 65, which would force said arm back and move the arm 67, so as to throw the said arm 67 out of engagement with the arm 68. Thereupon the weight 69 would pull down the arm 68 and operate the lever 70 so as to throw the clutch-sleeve 19 out of engagement with the clutch 18, and so stop the further movement of the chain 8, and no more ware would be conveyed to the leer until the necessary repair had been made to put the device into proper working order, so as to receive the ware in the normal manner. As a further precaution against difficulty in case where the conveyer 27 fails to operate we provide the plate 27ª with the opening 80. In case the ware should be broken and not high enough to operate the arm 65 as the second piece of ware entered the same space the first piece would be forced over the opening 80 and will drop through same out of the way of the second piece.

What we claim is—

1. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer for driving the same, a ratchet-wheel on said shaft, a pawl adapted to engage said ratchet-wheel, mechanism for holding said pawl out of engagement with said ratchet-wheel, means for withdrawing said mechanism by the movement of the ware into said conveyer, and mechanism for reciprocating said pawl.

2. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer to operate same, a ratchet-wheel on said shaft, a pawl adapted to engage said ratchet-wheel, a movable guard adapted to hold said pawl out of engagement with said ratchet-wheel, means for throwing said guard out of way by the movement of the ware onto said conveyer, and mechanism for reciprocating said pawl.

3. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer for operating same, a ratchet-wheel on said shaft, a pawl adapted to engage said ratchet-wheel, a swinging quadrant adapted to hold said pawl out of engagement with said ratchet-wheel, means for throwing said quadrant out of the way by the movement of the ware onto said conveyer, and mechanism for reciprocating said pawl.

4. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer for operating same, a ratchet-wheel on said shaft, a pawl adapted to engage said ratchet-wheel, means for holding said pawl out of engagement with said ratchet-wheel, tripping mechanism operated by the movement of the ware to said conveyer, connections between said tripping mechanism and withholding means whereby said withholding means is thrown out of the way, and mechanism for reciprocating said pawl.

5. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer to operate same, a ratchet-wheel on said shaft, a pawl adapted to engage said ratchet-wheel, means for holding said pawl out of engagement with said ratchet-wheel, a trip-finger in the path of the ware, connections between said trip-finger and said withholding means to withdraw same, and mechanism for reciprocating said pawl.

6. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer for operating same, a ratchet-wheel on said shaft, means for turning said ratchet-wheel operated by the movement of the ware on said conveyer, a leer-conveyer shaft, a ratchet-wheel on said shaft, a pawl adapted to engage said ratchet-wheel, means for withholding said pawl from engagement with said ratchet-wheel, means for withholding said withholding means upon the complete rotation of said first-named ratchet-wheel, and mechanism for reciprocating said pawl.

7. The combination with a leer, of a movable carrier adapted to convey the ware to said leer, an endless conveyer adapted to deposit the ware on the leer-pans, means for transferring the ware from said ware-carrier to said conveyer, a shaft, connections between said shaft and said conveyer to operate the same, a ratchet-wheel on said shaft, means for rotating said ratchet-wheel actuated by the movement of the ware on said conveyer, a leer-conveyer shaft, a ratchet-wheel on said shaft, a pawl adapted to engage said ratchet-wheel, a swinging guard to hold said pawl out of engagement with said ratchet-wheel, a cam-lug on said first-named ratchet-wheel, connections operated by said cam-lug to throw said guard out of the way, and mechanism for reciprocating said pawl.

8. The combination with a leer, of a movable carrier adapted to convey the ware to said leer, an endless conveyer adapted to deposit the ware on the leer-pans, means for transferring the ware from said ware-carrier to said conveyer, and a rotary guard above said conveyer.

9. The combination with a leer, of a movable carrier adapted to convey the ware to said leer, an endless conveyer adapted to deposit the ware on the leer-pans, means for transferring the ware from said ware-carrier to said conveyer, and a rotary guard having a series of guard-rails thereon.

10. The combination with a leer, of a movable carrier adapted to convey the ware to said leer, an endless conveyer adapted to deposit the ware on the leer-pans, means for transferring the ware from said ware-carrier to said conveyer, and a rotary spider above said conveyer.

11. The combination with a leer, of a movable carrier adapted to convey the ware to said leer, a leer-conveyer carrying pans, an endless conveyer adapted to deposit the ware on the leer-pans, a rotary guard above said conveyer, and means for rotating said guard and moving said leer-conveyer simultaneously.

12. The combination with a leer, of a movable carrier adapted to convey the ware to said leer, an endless conveyer adapted to deposit the ware on the leer-pans, means for transferring the ware from said ware-carrier to said conveyer, a safety device in the path of said ware, mechanism for stopping said movable carrier, and connections between said safety device and said mechanism.

13. The combination with a leer, of a movable carrier adapted to convey the ware to said leer, a leer-conveyer, an endless conveyer adapted to deposit the ware on the leer-pans, means for transferring the ware from said ware-carrier to said conveyer, an arm in the path of said ware, mechanism for stopping said movable carrier, and connections between said arm and said mechanism.

14. The combination with a leer, of a movable carrier adapted to convey the ware to said leer, an endless conveyer adapted to deposit the ware on the leer-pans, means for transferring the ware from said ware-carrier to said conveyer, an arm in the path of the ware, clutch mechanism on the shaft driving said movable carrier, and connections between said arm and said clutch mechanism for stopping said movable carrier.

15. The combination with a leer, of a movable carrier adapted to convey the ware to said leer, an endless conveyer adapted to deposit the ware on the leer-pans, means for transferring the ware from said ware-carrier to said conveyer, mechanism for imparting an intermittent movement to said conveyer, a plate having an opening therein over which said conveyer travels, said opening being adjacent the leer-opening.

In testimony whereof we, the said CHARLES R. KNAPP and VERGIL MULHOLLAND, have hereunto set our hands.
    CHARLES R. KNAPP.
    VERGIL MULHOLLAND.

Witnesses as to Knapp:
 ROBERT C. TOTTEN,
 J. R. KELLER.

Witnesses as to Mulholland:
 WM. B. HEAD,
 ENSYL B. DE SAULT.